3,027,329
GALLIUM NITRIDE PHOSPHORS
Hermann Georg Grimmeiss, Aachen, Germany, Hein Koelmans, Eindhoven, Netherlands, and Ingo Bruno Maak, Aachen, Germany, assignors to North American Philips Company, Inc., New York, N.Y., a corporation of Delaware
No Drawing. Filed Jan. 27, 1960, Ser. No. 4,868
Claims priority, application Germany Jan. 28, 1959
6 Claims. (Cl. 252—301.4)

This invention relates to a radiation source for converting electro-magnetic and/or electric energy into radiation with the aid of a luminescent material. The invention also relates to a luminescent material for use in such a radiation source and to a process for preparing such a luminescent material.

A radiation source in accordance with the invention is characterized in that the energy to be converted is supplied to gallium nitride which is activated with at least one of the elements from the group lithium, sodium, copper, silver, gold, beryllium, magnesium, calcium, strontium, barium, zinc, cadmium, mercury, aluminum, indium, thallium, tin and lead, so as to luminesce.

In the last few years, gallium nitride has been the subject of various scientific researches. Little attention has been paid to the possibility of rendering this substance luminescent by the incorporation of activators. Although it has been stated that gallium-nitride could be made electro-luminescent by the addition of suitable foreign substances, no mention is made of the nature of these foreign substances or the rules governing their choice. Furthermore, nothing has been said about the emission obtained neither about excitation by means of energy in a form other than that of an electric field.

Extensive experiments have shown that due to activation by the above-mentioned elements the gallium-nitride can be excited by cathode rays or by ultra-violet radiation and then emits a radiation of a wavelength which is different for different activators.

In addition to the activators, at least one coactivator can be incorporated and particularly suitable coactivators are the elements oxygen, sulphur, selenium, tellurium and fluorine. These co-activators can intensify the emission and can cause after-glow.

The total amount of activator is preferably chosen between $10^{-5}$ and $10^{-2}$ mol per mol of gallium nitride. The co-activator content can be equal to the activator content.

The difference in emission on excitation by ultraviolet radiation or by cathode rays is small.

There are several processes for preparing the gallium-nitride for a radiation source in accordance with the invention. All these processes have in common that gallium or a material containing gallium is heated in an ammonia atmosphere in the presence of the activator or activators and, if required, of the co-activator or co-activators. The heating period can very between 5 minutes and 10 hours.

For all the above-mentioned activators the following simple process can be used.

The gallium is heated together with the activator in an ammonia atmosphere at a temperature between 1000° C. and 1200° C. In this process, the starting material is a mixture of the element gallium and the activating element, the amount of the activator being chosen approximately equal to the amount ultimately required in the activated gallium nitride. For elements liable to evaporation at the said temperatures, a small excess of the activating element is added to the gallium in order to compensate for the evaporation losses.

For the activation with elements which are comparatively volatile at the said temperature, for example zinc or lead, the element can be added to the ammonia atmosphere in the vapour state. Thus, the ammonia stream is first passed over the heated activating element and then over the gallium which is heated to a temperature of from 1000° C. to 1200° C.

In the two above-described processes, more than one activator can be added either directly to the gallium, or, in particular the volatile elements, to the ammonia atmosphere.

For gallium nitride containing lithium as the activator, two further possible processes are described hereinafter.

Gallium can be alloyed with an amount of lithium which is approximately equal to the amount of gallium in gram-molecules. This means that the lithium amount in this alloy materially exceeds the lithium amount required as activator. When the alloy is heated in the ammonia stream, the larger part of the lithium disappears as lithium amide ($LiNH_2$). The heating is continued until the desired amount of lithium is left in the gallium nitride which has formed meanwhile. An advantage of this process is the lower heating temperature, for this can lie between 300° C. and 700° C. Hence, this process is of importance if one wishes to introduce, in addition to the lithium, a volatile element such as zinc or lead. Obviously, the evaporation of the volatile elements is materially less at the lower temperature than in the above-described method in which heating temperatures of from 1000° C. to 1200° C. must be used.

An alternative process for preparing lithium-activated gallium nitride starts from lithium gallium nitride ($Li_3GaN_2$). This substance is not luminescent and, as can be deduced from the formula, the lithium content is far too high to serve as activator. However, if this lithium gallium nitride is heated in an ammonia atmosphere to a temperature between 700° C. and 1000° C., the compound decomposes and lithium amide escapes. Heating is continued until the amount of lithium which is required as activator is left.

In the last-mentioned process, a second activator may be added to the lithium gallium nitride ($Li_3GaN_2$). This activator is incorporated in the nitride during the reaction and finally the desired luminescent phase is formed. Thus, this phase already contains lithium as an activator but in addition one of the other activators is incorporated. This process can be used for the above-mentioned comparatively volatile elements, but only just, and preferably in this process also one starts from a slight excess of the volatile element in order to compensate for the evaporation losses.

In order to illustrate the various processes for preparing gallium nitride activated with various elements, some examples will now be given.

*Example I*

A mixture of 10 grams of gallium and 0.2 gram of lithium in an alumina boat is inserted in a quartz tube. An ammonia stream is passed through this quartz tube while the temperature is raised to from 1000° C. to 1100° C. During this heating, an alloy of the gallium and the lithium is first formed and then converted in the ammonia stream into gallium nitride in which the lithium is incorporated as an activator. After heating for 1 hour, a luminescent lithium-activated gallium nitride is formed which luminesces when excited by ultra-violet radiation having a wave-length of 365 m$\mu$ or less or by cathode rays, giving a brilliant yellow light. The maximum of the luminescence lies at approximately 560 m$\mu$.

*Example II*

In the same manner as described in Example I, a zinc-activated gallium nitride can be prepared. Instead of 0.2 gram of lithium, 0.5 gram of zinc is added to the 10 grams of gallium. The temperature and the duration of the heat treatment can remain unchanged. On termination of the reaction, a zinc-activated gallium nitride is formed which luminesces when excited in the same manner as described in Example I, giving a brilliant blue light having a maximum at approximately 435 m$\mu$.

*Example III*

In the same way as described in Examples I and II, magnesium-activated gallium nitride can be prepared. The starting material is a mixture of 10 grams of gallium and 0.5 gram of magnesium. After heating, a substance has formed which on excitation similar to that described in the preceding examples, luminesces intensely with maximum values at 378, 389 and 405 m$\mu$.

*Example IV*

A mixture of 10 grams of gallium and 0.02 gram of lithium in an alumina boat is arranged in a quartz tube. In addition, a boat containing 0.03 gram of zinc is placed in this tube. The quartz tube is then heated to a temperature of 1050° C., a stream of ammonia being passed through the tube from the end at which the boat containing the zinc is disposed. Thus, a stream of ammonia containing zinc vapour is passed over the boat containing the mixture of gallium and lithium which in the meantime has become an alloy. After heating for 0.5 hour, a luminescent gallium nitride containing lithium and zinc as activators has formed. On excitation by ultra-violet radiation of a wave-length of 365 m$\mu$ or less or by cathode rays, a radiation of high intensity is emitted having maximum values at 435 and 560 m$\mu$.

*Example V*

A mixture of 10 grams of gallium, 0.01 gram of lithium and 0.01 gram of zinc in an alumina boat is placed in a quartz tube. The quartz tube and the boat are heated to a temperature of 1000° C. for 1.5 hour, while a stream of ammonia mixed with sulphur vapour is passed through. A reaction takes place in which lithium- and zinc-activated and sulphur-coactivated gallium nitride is formed which shows an intense emission on excitation by ultra-violet radiation of a wavelength of 365 m$\mu$ or less or by cathode rays, maximum values being found at 435 and 560 m$\mu$. In addition, the material produced has a brilliant yellow afterglow.

*Example VI*

An alloy is produced of 1 gram of lithium and 9 grams of gallium and heated together with 0.01 gram of copper to a temperature of 400° C. for 5 hours in a stream of ammonia. A luminescent material is produced which, on excitation with cathode rays or ultra-violet radiation having a wavelength of 365 m$\mu$ or less, luminesces giving a comparatively intense green light showing a maximum of the emission at 540 m$\mu$.

*Example VII*

An alloy is made from 1 gram of lithium and 9 grams of gallium and heated together with 0.001 gram of silver to a temperature of 350° C. in a stream of ammonia for 4 hours. The produced material luminesces giving a brilliant blue light with a maximum at 430 m$\mu$ on excitation by cathode rays or by ultra-violet radiation having a wavelength of 365 m$\mu$ or less.

*Example VIII*

An alloy of 1 gram of lithium and 9 grams of gallium is produced and heated together with 0.01 gram of mercury to a temperature of 400° C. in a stream of ammonia for 3 hours. The material produced luminesces giving a brilliant green light with a maximum of the emission at 490 m$\mu$ on excitation by cathode rays or by ultra-violet radiation having a wavelength of 365 m$\mu$ or less.

*Example IX*

An alloy is made from 1 gram of lithium and 9 grams of gallium and heated together with 0.02 gram of calcium to a temperature of 500° C. in a stream of ammonia for 2.5 hours. The material formed is intensely luminescent when excited by cathode rays or by ultra-violet radiation of a wavelength of 365 m$\mu$ or less. The radiation emitted by the material shows maximum values at 378, 389 and 405 m$\mu$.

*Example X*

An alloy is made from 1 gram of lithium and 9 grams of gallium and heated together with 0.01 gram of cadmium and 0.03 gram of mercury to a temperature of 400° C. in a stream of ammonia for 3 hours. The luminescent material formed shows a green emission having a maximum at 500 m$\mu$ when excited by cathode rays or by ultra-violet radiation of a wavelength of 365 m$\mu$ or less. In addition, the substance has an intense afterglow.

*Example XI*

An alloy from 1 gram of lithium and 9 grams of gallium is heated together with 0.01 gram of cadmium in a stream of ammonia containing sulphur to a temperature of 400° C. for 3 hours. The luminescent material produced can be excited by cathode rays or by ultra-violet radiation of a wavelength of 365 m$\mu$ or less. The radiation emitted by the material is green and shows maximum values at 378, 389, 405 and 506 m$\mu$.

*Example XII*

10 grams of $Li_3GaN_2$ are mixed with 0.03 gram of zinc and heated to a temperature of 800° C. in a stream of ammonia for 10 hours. The product obtained shows blue luminescence on excitation by cathode rays or ultra-violet radiation of a wavelength of 365 m$\mu$ or less. The emitted radiation shows a maximum at 435 m$\mu$. The intensity of the emitted radiation is very high.

*Example XIII*

10 grams of $Li_3GaN_2$ are mixed with 0.02 gram of zinc. The mixture is heated in an ammonia stream to a temperature of 800° C. for 10 hours. To the stream of ammonia there is added sulphur which acts as a coactivator in the final product, which thus is a lithium- and zinc-activated gallium nitride. The luminescent material can be excited with cathode rays or with ultra-violet radiation of a wavelength of less than 365m$\mu$ and then gives a brilliant blue-white light. The maximum of this emission lies at 435 m$\mu$.

What is claimed is:

1. A luminescent material consisting essentially of gallium nitride activated with from $10^{-5}$ to $10^{-2}$ mols of a primary activator selected from the elements of the group consisting of lithium, sodium, copper, silver, gold, beryllium, magnesium, calcium, strontium, barium, zinc, cadmium, mercury, aluminum, indium, thallium, tin and lead per mol of the gallium nitride.

2. A luminescent material consisting essentially of gallium nitride activated with from $10^{-5}$ to $10^{-2}$ mols of a primary activator selected from the elements of the group consisting of lithium, sodium, copper, silver, gold, beryllium, magnesium, calcium, strontium, barium, zinc, cadmium, mercury, aluminum, indium, thallium, tin and lead and from $10^{-5}$ to $10^{-2}$ mols of at least one secondary activator selected from the elements of the group consisting of oxygen, sulfur, selenium, tellurium and fluorine per mol of the gallium nitride.

3. A process for preparing a luminescent material consisting essentially of gallium nitride activated with from $10^{-5}$ to $10^{-2}$ mols of a primary activator selected from the elements of the group consisting of lithium, sodium, copper, silver, gold, beryllium, magnesium, calcium, strontium, barium, zinc, cadmium, mercury, aluminum, indium, thallium, tin and lead per mol of the gallium nitride comprising heating at a temperature between 300°

C. and 1200° C. a gallium containing material selected from the group consisting of gallium and lithium gallium nitride together with said activator in an ammonia atmosphere for a period of from 5 minutes to 10 hours.

4. A process for preparing a luminescent material consisting essentially of gallium nitride activated with from $10^{-5}$ to $10^{-2}$ mols of a primary activator selected from the elements of the group consisting of lithium, sodium, copper, silver, gold, beryllium, magnesium, calcium, strontium, barium, zinc, cadmium, mercury, aluminum, indium, thallium, tin and lead and from $10^{-5}$ to $10^{-2}$ mols of at least one secondary activator selected from the elements of the group consisting of oxygen, sulfur, selenium, tellurium and fluorine per mol of the gallium nitride comprising heating at a temperature between 300° C. and 1200° C. a gallium containing material selected from the group consisting of gallium and lithium gallium nitride together with said activators in an ammonia atmosphere for a period of from 5 minutes to 10 hours.

5. The process of claim 4 wherein a substantially equimolecular alloy of lithium and gallium is heated to a temperature between 300° C. and 700° C. for a period of time sufficient to leave the required amount of lithium in the resultant gallium nitride.

6. The process of claim 4 wherein lithium-gallium nitride ($Li_3GaN_2$) is heated to a temperature between about 700° C. and 1000° C. for a period of time sufficient to leave the required amount of lithium in the resultant gallium nitride.

References Cited in the file of this patent

Fischer: German application Ser. No. F15,799, printed Oct. 11, 1956 (K21f8303), 2 pages spec.